United States Patent Office 3,054,491
Patented Sept. 18, 1962

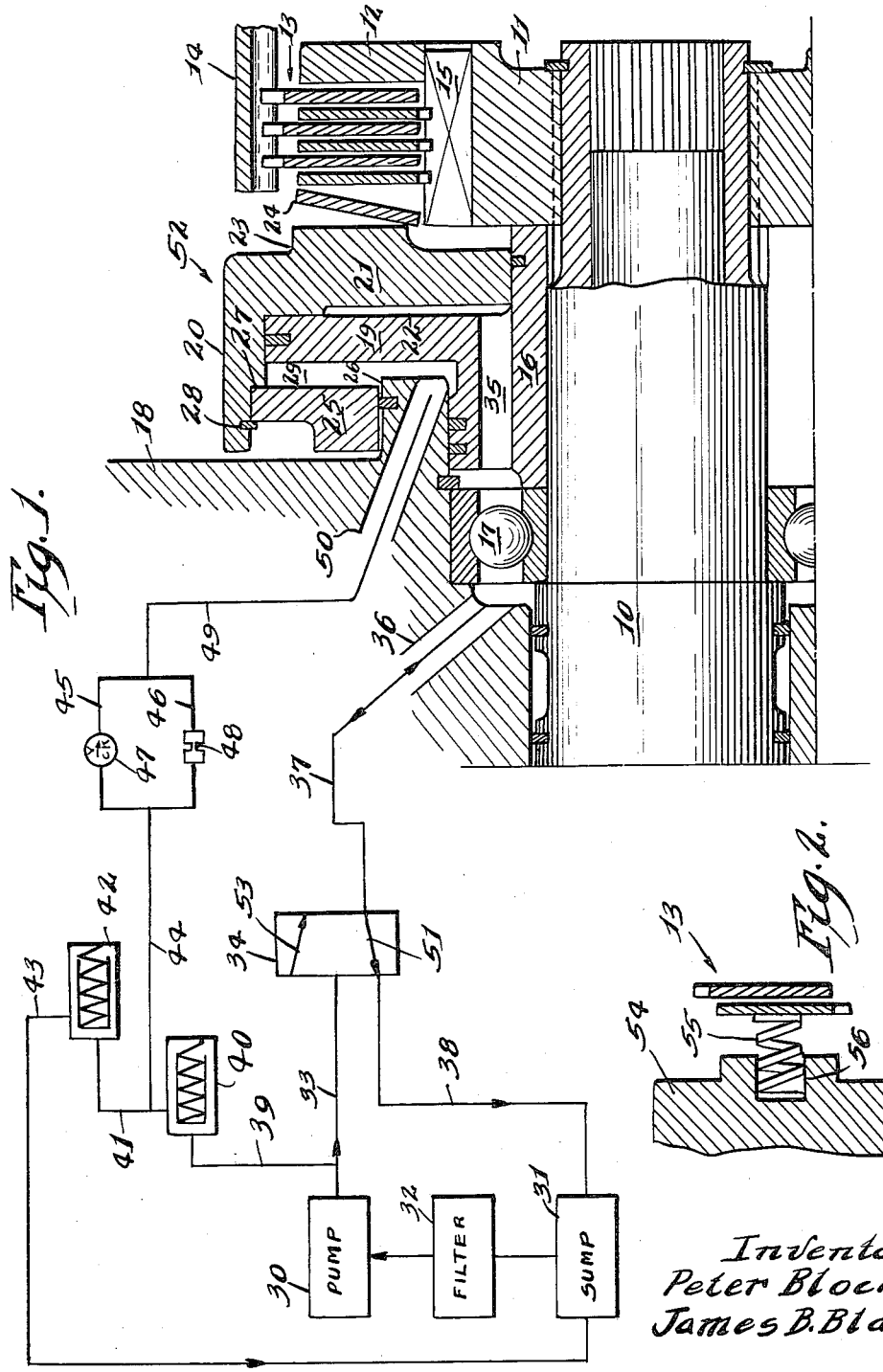

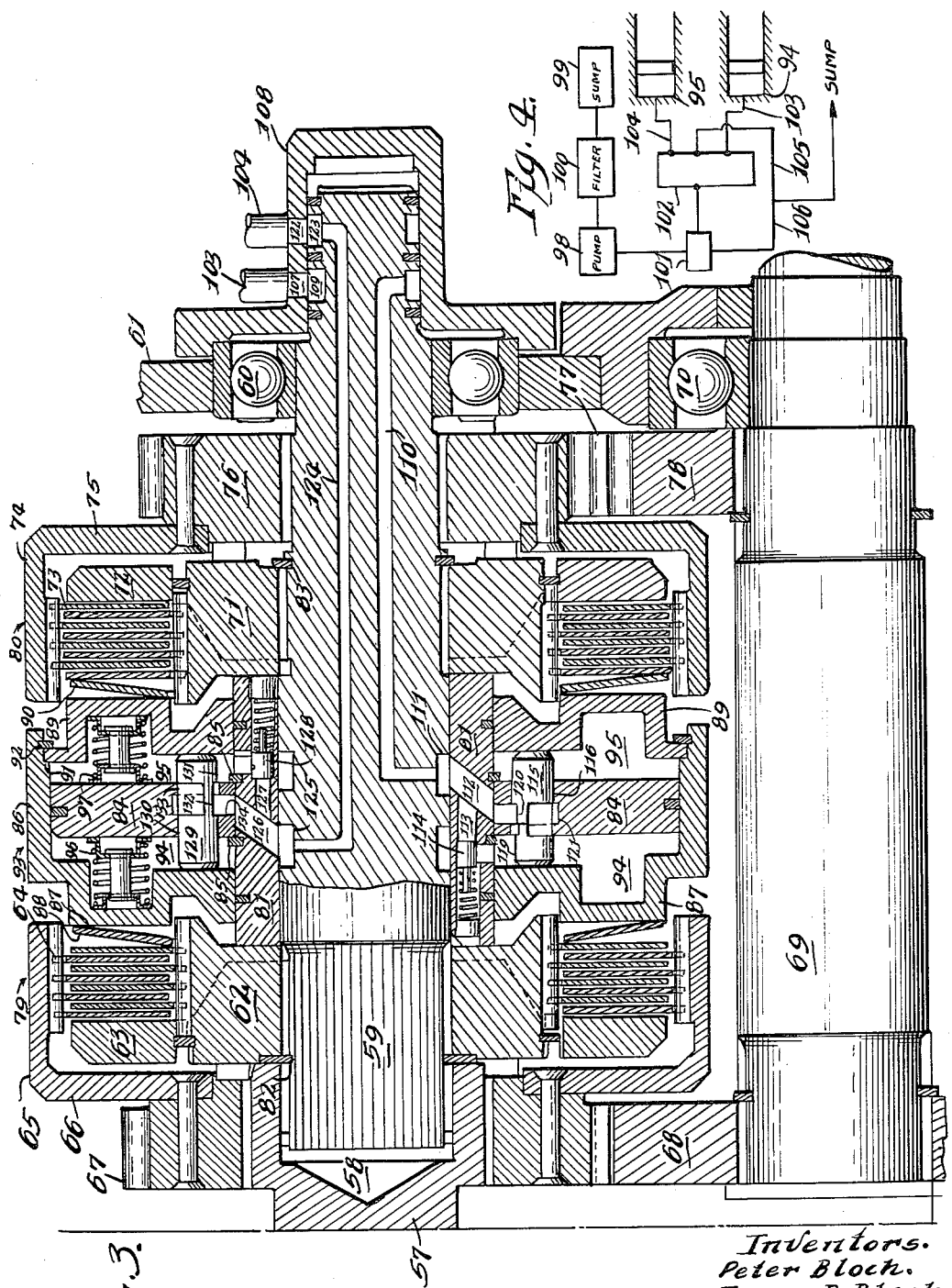

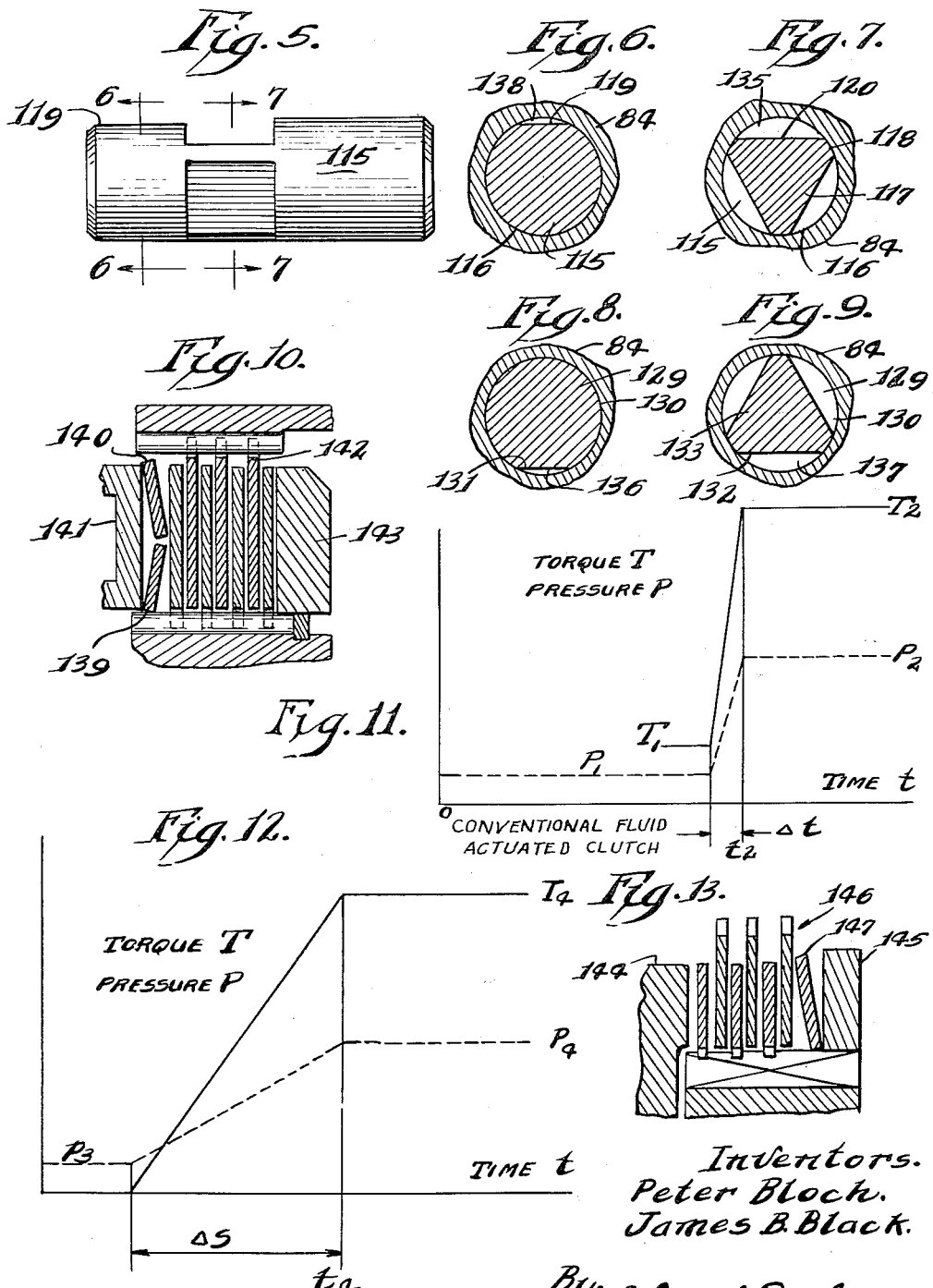

3,054,491
FLUID ACTUATED FRICTION CLUTCH
Peter Bloch and James B. Black, Rockford, Ill., assignors to Twin Disc Clutch Company, Racine, Wis., a corporation of Wisconsin
Filed Jan. 19, 1959, Ser. No. 787,520
8 Claims. (Cl. 192—87)

Our invention relates to fluid actuated clutches of the friction type and more particularly to an arrangement for materially reducing shock when the clutch plates are moved to engaging position.

Friction clutches of the fluid actuated type wherein a plurality of friction plates are engaged by applying a fluid pressure to a plate engaging piston or like member are characterized by an operating difficulty which is objectionable under certain conditions of use. The plates are customarily released by springs and in such position, the clutch cylinder is either devoid of pressure or may contain a fluid at very low pressure. For example, in an oil pressure actuated clutch, the cylinder thereof may be empty or may be simply filled with oil at low pressure.

When the control valve is opened to connect the cylinder with the source of pressure, the beginning pressure in the cylinder is relatively low and substantially less than the eventual peak engaging pressure. This is due to the fact that the initial movement of the clutch piston or pressure plate is exerted against relatively light resistance, it being only necessary to overcome the piston friction, to take up the plate clearance, and to overcome the opposing pressure of the release springs where such springs are used. Thereafter, when the plates are in contact, the pressure in the cylinder rises very rapidly to the regulated engaging pressure. It is this rapid rise which is objectionable because the clutch plates engage with a substantial jerk or shock.

It is therefore one object of our invention to provide a fluid actuated, friction clutch in which shock engagement of the clutch plates is prevented by delaying the rise in pressure acting against the pressure member which engages the plates and controlling the engaging speed of such member.

A further object is to provide a clutch of the character indicated in which he movement of the actuating member to a position engaging the clutch plates is hydraulically or pneumatically and elastically controlled.

A further object is to provide a clutch as above in which the actuating member movement to engaging position is under throttling control and spring restraint to thereby effect a gradual rise in the engaging pressure.

A further object is to incorporate the above principles in a dual clutch structure in such a way that the release of the engaged clutch is effected rapidly between engaged and neutral positions and thereafter the movement of the other clutch towards its engaged position is hydraulically or pneumatically braked by a throttling control on the release of the working fluid from the cylinder of the hitherto engaged clutch and is additionally elastically controlled.

These and further objects of the invention will be set forth in the following specification, reference being had to the accompanying drawings, and the novel means by which the objects are effectuated will be definitely pointed out in the claims.

In the drawings:

FIG. 1 is a combination view including a fragmentary, sectional view of one form of the improved clutch which employs a Belleville washer as the elastic member and schematically the associated hydraulic circuit, the clutch being shown in release position.

FIG. 2 is a fragmentary, modified section of the FIG. 1 clutch in which helical springs exercise the elastic restraint on the movement of the actuating member to engaging position.

FIG. 3 is a sectional elevation of a dual clutch structure which incorporates the elastic control shown in FIG. 1 and a modified throttle control on the movement of either actuating member to engaging position, the clutches being shown in release positions.

FIG. 4 is a schematic view of the fluid circuit employed in the FIG. 3 clutch.

FIG. 5 is an enlarged elevation of a valve pin used in the FIG. 3 clutch.

FIGS. 6 and 7 are sections along the lines 6—6 and 7—7, respectively, in FIG. 5 and additionally showing one set of flow relations with the fixed piston.

FIGS. 8 and 9 are inverted sections corresponding to FIGS. 6 and 7 and showing another set of flow relations with the fixed piston.

FIG. 10 is a fragmentary, sectional view showing a modified elastic control for the FIG. 1 and FIG. 3 clutches.

FIGS. 11 and 12 are performance curves showing by way of comparison the time-pressure-torque characteristics of a conventional, fluid actuated clutch and one embodying the features of this invention.

FIG. 13 shows a further variation in fragmentary section in which the elastic member is disposed between the back or abutment member of the clutch and the adjacent plate of the clutch stack.

While applicable to fluid actuated clutches in general, whether hydraulically or pneumatically controlled, the invention will be described in connection with the former type using a suitable oil as the working medium.

Referring to FIG. 1, the numeral 10 designates, by way of example, an input shaft that is connectible to a power source, although the power flow may occur in the opposite direction. Rotatably secured to the shaft 10 is a hub 11 having preferably integrally formed at one end thereof an annular flange constituting a back plate 12 which serves as an abutment against which a stack of clutch plates, generally indicated by the numeral 13, are gripped by means presently described. Alternate clutch plates have driving connection with a driven member 14, while the intervening plates have toothed connection with a plurality of keys 15, only one being shown and each key being suitably fastened to the hub 15.

Also carried by the shaft 10 is a sleeve 16 whose right and left ends, respectively, abut the hub 11 and a bearing 17 in which the shaft 10 is journaled and which is mounted in a stationary housing member 18 fragmentarily shown in FIG. 1 and through which the shaft 10 extends.

An annular flange 19 projects from the sleeve 16 between the ends thereof and slidable on the peripheral surface of the flange 19 in sealed relation thereto is an annular shell 20. The right end of the shell 20 is integral with an annular wall 21 whose inner peripheral surface has sealed and sliding relation to the sleeve 16, and defines in conjunction with this sleeve, the flange 19 and shell 20 an annular cylinder 22 to which engaging fluid pressure under suitable control is supplied as presently described. The wall 21 serves as the pressure plate which engages the clutch plates and preferably includes an annular boss 23 which is generally symmetrically related to the clutch plates. Between the boss 23 and the adjacent clutch plate is positioned a Belleville washer 24 which is an important feature of the invention.

The other end of the shell 20 carries internally thereof an annular wall 25 whose inner, peripheral surface has sealed and sliding relation with the outer, peripheral surface of an annular projection 26 provided on the housing member 18 and the inner, peripheral surface of this projection has sealed relation to a convenient outer surface portion of the sleeve 16. The wall 25 is fast to the shell 20 for axial movement therewith by having it positioned between a shoulder 27 formed internally of the shell and a locking ring 28 inset in this shell. The wall 25 defines in conjunction with the sleeve 16, flange 19, shell 20 and projection 26 an annular cylinder 29 which is the release cylinder for the clutch and to which oil at a substantially lower pressure than the engaging pressure is constantly supplied.

From the foregoing, it will be understood that the flange 19 serves as fixed piston and slidable relative thereto is a cylinder constituted by the shell 20 and end walls 21 and 25 which partially define the engaging and release cylinders 22 and 29, respectively.

Still referring to FIG. 1 and the hydraulic circuit which determines the supply of pressure oil to the respective cylinders, the numeral 30 indicates a suitably driven pump which draws the oil from a convenient sump 31 through a filter 32 and delivers the same through a line 33 to the input side of a conventional control valve 34. The internal construction of this valve is well known and hence is not shown in detail. When conditioned to match the circuit as shown in FIG. 1, the clutch being released, pump flow through the valve 34 is blocked and oil hitherto in the cylinder 22 has been discharged successively through a longitudinal passage 35 in the sleeve 16, the bearing 17, a passage 36 in the housing member 18, a line 37, the valve 34 and a line 38 to the sump 31. Pressure is therefore non-existent in cylinder 22.

One end of a line 39 connects with the line 33 between the pump 30 and control valve 34 and the opposite end of the line 39 connects with the inlet of a conventional pressure regulating valve 40. The outlet of this valve connects with one end of a line 41 whose opposite end connects with the inlet of a second, conventional pressure regulating valve 42 whose outlet connects by line 43 with the sump 31.

One end of a line 44 taps the line 41 and the former is provided with parallel branches 45 and 46 which respectively include a check valve 47 and a throttling orifice 48. The branches 45 and 46 connect with a common line 49 leading to a passage 50 in the housing member 18 and thence with the release cylinder 29. The check valve 47 provides for free flow of oil to the release cylinder 29, but blocks flow from this cylinder through the branch 45 and directs the same through the branch 46 and the orifice 48.

As clearly shown in FIG. 1, the valve 42 is located in back pressuring relation to the valve 40 and the latter will be regarded as set to establish a pressure of 140 p.s.i. in the line 33, i.e., the engaging pressure of the clutch, while the valve 42 will be assumed as set for a pressure of 40 p.s.i., i.e., the release pressure for the clutch. These pressures are not by way of limitation, but may be adjusted to suit operating requirements subject to the requirement that the engaging pressure is substantially larger than the releasing pressure.

With the parts in the several positions shown in FIG. 1, the engaging cylinder 22 connects through the passages and lines above referred to, including a passage 51 in the control valve 34, with the sump 31 so that the pressure in the cylinder 22 is 0 p.s.i. At the same time, there is a pressure under the assumed condition of 40 p.s.i. in the release cylinder 29 and this pressure is maintained constant as long as the pump 30 is running. The clutch is therefore hydraulically biased to the release position shown with the shell 20 and associated walls 21 and 25, generally comprising a movable cylinder 52, shifted to the left.

To engage the clutch, the control valve is shifted to break connection between the line 37 and valve passage 51 and to connect the lines 33 and 37 through a passage 53 in the control valve 34. Pressure being thereby established in the engaging cylinder 22 which is higher than the release pressure, the wall 21 begins moving towards the right along with the wall 25 so that the oil in the release cylinder 29 is forced through the passage 50, line 49, throttling orifice 48 and then successively through the lines 44, 41 and 43 to the sump 31. This flow closes the check valve 47 and the flow restriction provided by the orifice 48 in effect sets up a hydraulic brake on the movement of the wall 21 towards clutch engaging position.

The ensuing action may be divided into three phases. First, the movement of the wall 21 takes up the clearances between the clutch plates 13 and Belleville washer 24. Since the only resistance at this time is the friction of the shiftable cylinder 52 and the throttled flow of the oil out of the release cylinder 29, the pressure in the engaging cylinder 22 is substantially below the final engaging pressure but above the release pressure. The second phase is the flattening of the Belleville washer 24 and the third phase is the application of the full clamping force to the clutch plates 13.

The orifice 48 insures a relatively slow and in effect a braking movement of the wall 21 towards engaging position compared to a free movement of such wall and the orifice size may be varied to suit any particular operating requirement while the Belleville washer 24 provides for a gradual or delayed rise in and to the final clamping pressure. The combination of these two factors insures a soft engagement of the clutch plates.

The advantages of the improved clutch over those of the conventional hydraulic type are graphically shown in FIGS. 12 and 11, respectively, each being plotted against torque, pressure and time as represented generally by the factors T, P and t and with the torque curves in full lines and the pressure curves in dotted lines.

In the conventional clutch (FIG. 11), when the piston, corresponding to the wall 21 in the improved clutch, begins moving towards engaging position to take up clutch plate clearance, the pressure behind the piston is relatively low and is represented by $P_1$ and the torque value is zero. When the piston first hits the clutch stack, the torque jumps to the value $T_1$ corresponding to the pressure $P_1$ and thereafter the piston pressure increases rapidly to the engaging pressure $P_2$ in a very short time $\Delta t$. The final torque $T_2$ which is proportional to the engaging pressure $P_2$ is attainable in the same time so that the clutch engagement is accompanied by a substantial jerk.

By comparison in the improved clutch (FIG. 12), when the wall 21 begins moving in the engaging direction, the actuating pressure then is also relatively low and is represented by $P_3$ and remains so until the clearances between the clutch plates 13 and Belleville washer 24 are taken up. With continued movement of the wall 21, the pressure behind the wall 21 begins to increase due to the deflection of the washer 24 and in accordance with its spring rate until the washer is either fully flattened or until the ultimate engaging pressure is attained, whichever first occurs. The final pressure is represented by $P_4$ and the corresponding torque by $T_4$ and these values are achieved in a substantially longer time $\Delta s$, the time of the pressure rise being determined by the size of the orifice 48. In other words, the torque rise occurs over a longer time than characterizes the FIG. 11 clutch so that the engagement of the improved clutch is relatively soft.

Whether the washer 24 is flattened depends upon the spring force thereof which may be varied to fit different conditions. The same consideration applies to the helical springs used as a substitute for the washer 24 as presently described. The helical springs may or may not be driven solid when the clutch is engaged.

To release the clutch, the control valve 34 is restored to the condition shown in FIG. 1, the constant pressure in the release cylinder 29 takes control and moves the shiftable cylinder 52 to the position shown. Oil in the engaging cylinder 22 flows out rapidly through the passage 35 and connected lines to the sump 31 so that the clutch disengages quickly.

The invention is not restricted to the use of Belleville washers, but may be modified by the use of helical springs as the elastic medium. Referring to FIG. 2, the numeral 54 designates a wall corresponding to the wall 21 in FIG. 1. Interposed between the wall 54 and the adjacent plate of the clutch stack 13 is a plurality of helical springs 55, only one being shown, which are equispaced around the wall 54 and with one end of each spring mounted in a pocket 56 recessed in such wall.

In FIG. 3 is shown the application of the invention to a dual clutch construction wherein the clutches are selectively controlled and related to provide a simultaneous neutral of both clutches, or an engagement of either clutch accompanied by a simultaneous disengagement of the other clutch. For descriptive purposes, this arrangement is shown in connection with appropriate gearing for securing forward and reverse drives, but since the gearing does not form any part of the invention, it will be understood that the gearing may be disposed for drive in the same direction at the same or different speeds.

Referring to FIG. 3, the numeral 57 designates an input shaft connectible at one end to a source of power and whose opposite end includes a pocket 58 for splinedly receiving one end of an intermediate shaft 59 whose opposite end is journaled in a bearing 60 carried by a wall 61 which may form part of a conventional housing. Adjacent the input shaft 57, a hub 62 is splined to the intermediate shaft 59 and carries an annular flange serving as a back plate 63 against which a plurality of clutch plates constituting a stack 64 are intended to be clamped by means presently described. Alternate plates of the stack 64 have driven and relative sliding connection with the hub 62 and the intervening clutch plates have driving and relative sliding connection with the interior of an annular shell 65 formed integrally with a radially inward, annular flange 66. This flange is secured to a pinion 67 which encircles and is spaced from the input shaft 57 and meshes with a gear 68 fast on one end of an output shaft 69 whose opposite end extends through the wall 61 for connection to a load and is journaled in a bearing 70 carried by this wall.

Spaced from the hub 62 is another hub 71 rotatably secured to the intermediate shaft 59 and carrying an annular flange which constitutes a back plate 72 against which a plurality of clutch plates forming a stack 73 are clamped by means presently described. Alternate plates of the stack 73 have driven and relative sliding connection with the hub 71 and the intervening clutch plates have driving and relative sliding connection with the interior of an annular shell 74 formed integrally with a radially inward, annular flange 75. This flange is secured to a pinion 76 which encircles and is spaced from the intermediate shaft 59 and meshes with an idler gear 77 which in turn meshes with a gear 78 fast on the output shaft 69. The idler gear 77 is only shown fragmentarily and it will be obvious that its relation to the pinion 76 and gear 78 follows the usual grouping of three gears to convert forward to reverse motion.

So far as described, the clutch plate stacks 64 and 73 and their immediately associated parts will be regarded as the forward and reverse drive clutches 79 and 80, all respectively.

The mechanism for engaging either clutch while simultaneously disengaging the other clutch and including a simultaneous neutral for both clutchs will now be described, still referring to FIG. 3.

A sleeve 81 is telescoped over the intermediate shaft 59 and is held against axial movement by positioning between the hubs 62 and 71 which themselves are held against relative separation by lock rings 82 and 83, respectively, which are set in the intermediate shaft 59. A ring 84 encircles the mid-portion of the sleeve 81 and is held against axial movement by lock rings 85—85 set in this sleeve.

Slidable on and sealably related to the outer, peripheral surface of the ring 84 is an annular shell 86 whose left end is reduced to provide an annular, pressure plate 87 between which and the adjacent clutch plate of the stack 64 is positioned a Belleville washer 88. The inner, peripheral surface of the pressure plate 87 is slidable on and sealably related to the sleeve 81.

The other or right end of the shell 86 carries internally thereof an annular, pressure plate 89 whose inner, peripheral surface is slidable on and sealably related to the sleeve 81 and between the pressure plate 89 and the adjacent clutch plate of the stack 73 is positioned a Belleville washer 90. The pressure plate 89 is fast to the shell 86 for axial movement therewith by positioning between a shoulder 91 formed internally of the shell and a locking ring 92 inset in this shell.

As in the comparable situation in FIG. 1, the ring 84 functions as a fixed piston and will be so referred to hereinafter while the shell 86 and pressure plates 87 and 89 constitute an axially shiftable cylinder 93. Further, and under the assumed situation, the fixed piston 84, shell 86, pressure plate 87 and sleeve 81 define a forward drive cylinder 94, while the fixed piston 84, shell 86, pressure plate 89 and sleeve 81 define a reverse drive cylinder 95. Whenver actuating pressure is supplied to either the cylinder 94 or the cylinder 95, it will be obvious that the associated pressure plate moves in a direction to engage the associated clutch while the other pressure plate simultaneously moves in a direction enabling the release of the other clutch. The clutches 79 and 80 are simultaneously biased towards neutral positions by conventional spring assemblies generally indicated by the numerals 96 and 97, respectively, positioned between the fixed piston 84 and the pressure plate 87, and the fixed piston 84 and the pressure plate 89.

In the FIG. 3 arrangement, the operation of either clutch from neutral to engaged position has the same characteristics as that shown in FIG. 1 as regards the relatively slow movement of one pressure plate to engaging position occasioned by a hydraulic restraint on the connected and other pressure plate and the delayed rise in the clamping pressure due to the influence of the associated Belleville washer. The principal difference between the FIG. 1 and FIG. 3 clutches resides in the fact that, since the pressure plates 87 and 89 in the latter clutch are tied together, the movement of one pressure plate to engaging position is accompanied by a simultaneous shift of the other pressure plate to a position in which the associated clutch is released, it is unnecessary to maintain a release pressure in the cylinders 94 and 95. However, each cylinder and the respective lines leading thereto are constantly maintained full of oil at a relatively low pressure, such as 5 to 10 p.s.i., while the engaging pressure for each clutch may be 100 to 150 p.s.i., these pressure being by way of example only and not restrictive. This filling oil compensates for leakage and insures a more prompt movement of either plate when oil is additionally fed to the associated cylinder for engaging purpose. The throttled escape of this filling oil from the cylinder of the clutch being released provides for the slow pressure plate movement of the other clutch from neutral to engaged position.

The hydraulic circuit and associated structural features for accomplishing the foregoing will now be described, reference being first to FIG. 4.

A suitably driven pump 98 draws oil from a convenient sump 99 through a filter 100 and delivers the same through a conventional, pressure regulating valve 101 to a control valve 102 which connects by lines 103 and 104 with the forward and reverse drive cylinders 94 and 95, respectively. The control valve 102 also has an output connection with the sump 99 through a line 105 and the latter also connects through a line 106 with the output of the regulating valve 101. The relation of the valves 101 and 102 is such that with the latter in a position determining the simultaneous neutral of the clutches 79 and 80, oil at the indicated, low filling pressure is maintained in the cylinders 94 and 95 and when the valve 102 is shifted to engage one clutch by admitting oil at higher pressure to the associated cylinder, oil at the lower filling pressure is maintained in the other cylinder. For these purposes, the valves 101 and 102 may be related and constructed as shown in U.S. Letters Patent No. 2,464,538, dated March 15, 1949, and for specific details not mentioned herein, reference may be had to this patent.

Referring to FIG. 3, the end of the oil line 103 remote from the control valve 102 connects through a port 107 provided in a cap 108 extending from the wall 61 with an annular channel 109 around the right end of the intermediate shaft 59, and the channel 109 connects through a passage 110 extending partly longitudinally and partly radially of and through the intermediate shaft 59 with an annular channel 111 on the surface of this shaft. The channel 111 constantly communicates with one end of a passage 112 extending outwardly through the sleeve 81. Within the sleeve 81 is provided a right angle passage 113 including a longitudinal portion having an end intersecting the passage 112 and a radial portion having an end communicating with the forward drive cylinder 94. Flow of oil through the passage 113 is controlled by a spring loaded, check valve 114 which is biased to a position closing the passage 113.

A valve pin 115 is slidably mounted in an aperture 116 extending transversely of the fixed piston 84 and the ends of this pin constantly abut convenient interior surfaces of the pressure plates 87 and 89 so that axial movements of these connected plates effect like movements of the valve pin 115 for control purposes presently described.

The details of the valve pin 115 are more particularly shown in FIGS. 5 to 7, inclusive. The pin 115 is generally cylindrical except that an intermediate portion 117 of determined length possesses a triangular section whose adjacent sides are connected by curved portions 118 to provide bearing in the aperture 116. From the triangular section 117 to the left end of the pin 115, as viewed in FIGS. 3 and 5, the latter is flattened to provide a face 119 whose plane is parallel to the uppermost face 120 of the triangular section 117 and at a greater distance from the longitudinal center line of the pin 115. This relationship provides, in conjunction with the fixed piston 84, differences in flow control to and from the forward drive cylinder 94.

In the neutral position shown in FIG. 3, the face 120 traverses an arcuate slot extending from the inner periphery of the fixed piston 84 in intersecting relation to the aperture 116 and constituting a passage 121 which has constant communication with the passage 112. Only one valve pin 115 is shown in FIG. 3, but it will be obvious that others may be used if circumstances require and such would be suitably distributed around the fixed piston 84.

For oil pressure feed to the reverse drive cylinder 95, the end of the oil line 104 remote from the control valve 102 communicates successively through a port 122 in the cap 108, an annular channel 123 around the intermediate shaft 59, a passage 124 in this shaft arranged generally like the passage 110, and an annular channel 125 around the intermediate shaft 59 with the inner end of a passage 126 extending tranversely through the sleeve 81, this passage being comparable to the passage 112.

A right angle passage 127, similar to the passage 113, is also provided in the sleeve 81, the longitudinal portion of this passage intersecting the passage 126 and the radial portion communicating with the reverse drive cylinder 95. Flow through the passage 127 is controlled by a spring loaded, check valve 128 which is biased to a position closing this passage.

A valve pin 129 is slidably mounted in an aperture 130 extending transversely through the fixed piston 84 and its ends are related to the pressure plates 87 and 89 in the same manner as the valve pin 115. The valve pin 129 is identical with the valve pin 115 but is reversed in position and, in the relationship shown in FIG. 3 and specifically in FIGS. 8 and 9, is inverted to place the faces 131 and 132 lowermost or radially inward, these faces corresponding, respectively, in a functional sense to the faces 119 and 120. As in FIG. 7, the face 132 constitutes one part of the triangular section of the valve pin 129 as generally indicated by the numeral 133 in FIGS. 3 and 9 and, in the neutral position shown, traverses the outer portion of an arcuate passage 134 in the fixed position 84, which passage is similar to the passage 121, and the inner end of the passage 134 terminates at the inner periphery of the fixed piston 84 and constantly communicates with the passage 126. The number of valve pins 129 is optional.

Considering the operation of the dual clutch, when the control valve 102 is in neutral position, the clutches are released, the other parts are conditioned as shown in FIG. 3 and the cylinders 94 and 95 are filled with oil at some pressure within the range assumed of 5 to 10 p.s.i. To engage the clutch 79, the control valve 102 is shifted to the appropriate position and pressure begins increasing in the associated lines, passages and channels above noted leading to the passage 112. This pressure opens the check valve 114 to admit such pressure to the forward drive cylinder 94 so that the pressure plate 87 begins to move towards the engaged forward drive clutch position. Since the pressure plates 87 and 89 move together, the valve pins 115 and 129 also move simultaneously therewith. The movement of the valve pin 115 to the left provides for direct communication of the passage 112 with the cylinder 94 and relatively free flow of the oil through the passage 121 and a port 135 included between the wall of the aperture 116 and the then shifted position of the flat face 120 (see FIG. 7). On the other hand, the left shift of the valve pin 129 moves the flat face 131 into such relation to the wall of the aperture 130 that a throttling orifice 136 (see FIG. 8) is formed which restricts the flow of oil from the reverse drive cylinder 95 to the passages 134 and 126 and thence through the channels, passages and lines above noted to the sump 99.

The engagement of the forward drive clutch 79 therefore proceeds in the same manner as indicated for the FIG. 1 clutch, i.e., the pressure plate 87 moves at relatively slow speed due to the throttled escape of oil from the reverse drive cylinder 95 and the rise in the clamping pressure is delayed by the Belleville washer 88. In this situation, the cylinder 95 may be regarded as a braking cylinder.

To release the forward drive clutch 79, the control valve 102 is restored to the neutral position and although the check valve 114 is then closed, the valve pin 115 is then to the left of the position shown in FIG. 3 so that the oil in the forward drive cylinder 94 discharges rapidly to the passage 121 through the port 135 and thence to the sump 99. This condition continues until the valve pin 115 returns to the neutral position shown in FIG. 3 and the clutch 79 is accordingly quickly released. This releasing action is facilitated by the extending action of the hitherto compressed spring assemblies 97 and the pressure of the filling oil in the cylinder 95.

To engage the reverse drive clutch 80 from the released position shown, pressure oil is supplied to the passage 126 in the manner noted and first opens the check valve 128 to admit the increased pressure oil to the reverse drive cylinder 95 so that the pressure plate 89 begins moving in an engaging direction or towards the right. Movement of the valve pin 129 in the same direction therefore provides for direct and relatively free flow of the engaging pressure oil to the cylinder 95 through the passage 134 and a port 137 (see FIG. 9) included between the wall of the aperture 130 and the then shifted flat face 132. At the same time, release of oil from the forward drive cylinder 94 is throttled by the valve pin 115 through an orifice 138 (see FIG. 6) included between the wall of the aperture 116 and the then shifted flat face 119, the cylinder 94 being regarded as a braking cylinder. The engaging movement of the pressure plate 89 is like that of the pressure plate 87 and is also attended by a delayed clamping pressure rise due to the action of the Belleville washer 90.

While the foregoing relates the engagement of either clutch from a neutral position, it will be apparent that the shift may be from forward to reverse or vice versa, but in either case, the shift is through neutral so that the clutch which is being released does so rapidly.

Inadvertent rotation of the valve pins 115 and 129 does not disturb the port and throttling orifice relations as above noted, the former being particularly maintained by the triangular sections 117 and 133 and the arcuate passages 121 and 134, respectively.

In FIG. 10 is shown a further variant involving the use of concentric, Belleville washers 139 and 140 disposed either between a pressure plate 141 and a clutch plate stack 142, or alternatively between this stack and a back plate 143. This dual washer construction may also be used in the FIGS. 1 and 3 clutches. For convenience, the washers 139 and 140 are shown in V-relation, but their surfaces may be parallel, the controlling relation being their concentricity.

Referring to FIG. 13, there is shown a further variation as referred to generally above wherein the numeral 144 designates the pressure plate or member of the clutch which includes the usual back or abutment plate 145 and between these plates the usual clutch plate stack 146. The Belleville washer 147 is positioned between the back plate 145 and the nearest plate of the stack 146. This arrangement may also be employed in the FIGS. 1 and 3 clutches and it will be further obvious that the helical springs 55 in FIG. 2 and the concentric Belleville washers 139 and 140 in FIG. 10 may also be used in the same location and in either of their suggested relations. Spring deflection is accomplished in either of the noted positions and with any of the clutches.

We claim:

1. A fluid actuated clutch comprising a stack of annular, friction plates shiftable between engaged and released positions, a fixed, annular piston, a cylindrical shell including radial end walls slidably related to and surrounding the piston and defining therewith annular braking and engaging cylinders, means for supplying fluid under pressure to the engaging cylinder to move the shell and one of its end walls to engage the plates, spring means engageable with an end plate of the stack and deflected by the engaging movement of said one end wall, means for continuously maintaining a filling of the braking cylinder with fluid at a pressure substantially below the engaging pressure and including sump connecting means provided in the piston for continuously effecting a throttled discharge of fluid from the braking cylinder when the shell is moved in clutch engaging direction.

2. A clutch as defined in claim 1 wherein the spring means is positioned between said one end wall and the adjacent plate of the stack.

3. In clutch construction, the combination of a pair of selectively engageable, friction plate clutches, fluid actuated means comprising a fixed piston, connected pressure members disposed on opposite sides of and shiftable relative to the piston, a cylinder for each clutch included between the piston and the associated pressure member, means for constantly maintaining a basic minimum fluid pressure in both cylinders, means for increasing the pressure in either cylinder to move the related pressure member to engage the associated clutch while maintaining the minimum pressure in the other cylinder, sump connecting means provided in the piston for continuously throttling the discharge of fluid forced out of said other cylinder by the other pressure member to thereby control the engaging speed of said related pressure member, and spring means engageable with an end plate of the clutch being engaged and deflected by the engaging movement of said related pressure member for delaying the rise in the engaging pressure to final value.

4. A clutch construction as defined in claim 3 wherein spring means are disposed between the fixed piston and the pressure members, respectively, for biasing the clutches to neutral positions.

5. A clutch construction as defined in claim 3 wherein separate valve pins are carried by the fixed piston and are axially shiftable by movements of the pressure members, the fixed piston including passage means connecting with the fluid pressure means and the valve pins intersecting the passage means and having their peripheries shaped in relation to the fixed piston to define ports therewith for respectively determining when shifted the admission of engaging fluid pressure to the cylinder of the clutch being engaged and the throttled discharge of fluid from the other cylinder.

6. A clutch construction as defined in claim 5 wherein the valve pins are cylindrical and each pin has a pair of flat peripheral portions at different distances, respectively, from the pin axis, the flat portion at the smaller distance defining with the fixed piston the port for admitting clutch engaging pressure to the associated cylinder and its length being such that said port is maintained substantially open until the associated clutch is restored to neutral.

7. A clutch construction as defined in claim 3 wherein communication means for admitting engaging pressure to the cylinder of one clutch comprises dual passages respectively including a check valve which opens only in an admitting direction and a first valve pin slidable in the fixed piston and endwise shiftable by the pressure member of the other clutch, and other communication means for effecting the throttled discharge of the fluid from the other cylinder including a second valve pin slidable in the fixed piston and endwise shiftable by the pressure member of said other clutch.

8. A clutch as defined in claim 1 wherein separate valve pins are carried by the fixed piston and are axially shifted by movements of the endwalls, the fixed piston including one passage means connecting with the fluid pressure means and sump connecting passage means and the valve pins respectively intersecting the passage means and having their respective peripheries shaped in relation to the fixed piston to define ports therewith for respectively determining when shifted the admission of fluid pressure to the engaging cylinder and the throttled discharge of fluid from the braking cylinder.

References Cited in the file of this patent

UNITED STATES PATENTS

| | | |
|---|---|---|
| 918,652 | Bryan | Apr. 20, 1909 |
| 2,386,220 | Lawler | Oct. 9, 1945 |
| 2,464,538 | Vanderzee | Mar. 15, 1949 |
| 2,540,965 | Schellinger | Feb. 6, 1951 |
| 2,738,864 | Becker | Mar. 20, 1956 |
| 2,833,385 | Peterson | May 6, 1958 |
| 2,868,341 | Snoy | Jan. 13, 1959 |
| 2,920,732 | Richards et al. | Jan. 12, 1960 |
| 2,922,314 | Johnson et al. | Jan. 26, 1960 |
| 2,950,629 | Holdeman et al. | Aug. 30, 1960 |